US005792385A

United States Patent [19]

Scheuing et al.

[11] Patent Number: 5,792,385

[45] Date of Patent: Aug. 11, 1998

[54] LIQUID PERACID PRECURSOR COLLOIDAL DISPERSIONS: LIQUID CRYSTALS

[75] Inventors: David R. Scheuing, Danville; James D. McManus, Tracy; Gregory van Buskirk, Danville, all of Calif.

[73] Assignee: The Clorox Company, Del.

[21] Appl. No.: 450,741

[22] Filed: May 25, 1995

[51] Int. Cl.[6] .......... C09K 19/52; C11D 17/04

[52] U.S. Cl. .......... 252/299.01; 510/277

[58] Field of Search .......... 252/299.01; 510/277

[56] References Cited

U.S. PATENT DOCUMENTS

| | | | |
|---|---|---|---|
| 3,960,743 | 6/1976 | Nakagawa et al. | 252/99 |
| 4,496,473 | 1/1985 | Sanderson | 252/186.14 |
| 4,613,452 | 9/1986 | Sanderson | 252/186.23 |
| 4,681,592 | 7/1987 | Hardy et al. | 8/111 |
| 4,778,618 | 10/1988 | Fong et al. | 252/186.23 |
| 4,891,147 | 1/1990 | Gray et al. | 252/104 |
| 4,959,187 | 9/1990 | Fong et al. | 260/402 |
| 5,019,289 | 5/1991 | Gray et al. | 252/95 |
| 5,073,285 | 12/1991 | Liberati et al. | 252/94 |
| 5,075,026 | 12/1991 | Loth et al. | 252/122 |
| 5,082,584 | 1/1992 | Loth et al. | 252/122 |
| 5,182,045 | 1/1993 | Rowland et al. | 252/186.38 |
| 5,391,812 | 2/1995 | Rowland et al. | 560/145 |
| 5,419,847 | 5/1995 | Showell et al. | 252/100 |
| 5,549,840 | 8/1996 | Mondin et al. | 510/365 |

FOREIGN PATENT DOCUMENTS

| | | | |
|---|---|---|---|
| 0 293 040 | 11/1988 | European Pat. Off. | C11D 3/39 |
| 0294 904 | 12/1988 | European Pat. Off. | C11D 3/39 |
| 0 340 000 | 11/1989 | European Pat. Off. | C11D 3/39 |
| 0 431 747 | 6/1991 | European Pat. Off. | C11D 3/39 |
| 0 484 095 | 5/1992 | European Pat. Off. | C11D 17/00 |

*Primary Examiner*—C. H. Kelly
*Attorney, Agent, or Firm*—Sharon R. Kantor

[57] ABSTRACT

A stable liquid peracid precursor composition for delivering a bleaching and cleaning material is provided in which the liquid peracid precursor composition combines a dispersion medium which comprises a stabilizing effective amount of a liquid matrix and an emulsifier, and a dispersed phase that comprises a peracid precursor. The bleaching and cleaning material comprises either a hydrophobic or hydrotropic generated mono- or diperoxyacid, or mixtures thereof.

23 Claims, 1 Drawing Sheet

LIQUID PERACID PRECURSOR COLLOIDAL DISPERSIONS: LIQUID CRYSTALS

BACKGROUND OF THE INVENTION

1. Field of the Invention

The invention relates to novel systems for the delivery of peracid oxidants for bleaching or cleaning applications, which oxidants may be generated from peracid precursors. More particularly, this invention is concerned with the formation of liquid peracid bleach activator systems in which a peracid precursor may be stably maintained in colloidal dispersion form.

2. Description of the Pertinent Art

Fong et al., U.S. Pat. No. 4,778,618 and Fong et al., U.S. Pat. No. 4,959,187 disclose certain preferred peracid precursors, also known as "activators" or "bleach activators", which have the general formula:

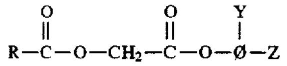

wherein R is, for example, $C_{1-20}$ alkyl, Ø represents $C_6H_4$ and Y and Z are separately H or another substituent, typically a water-solubilizing group. However, both references state that the depicted granular activators and the hydrogen peroxide source may need to be kept separate to prevent premature decomposition.

Two patents to Sanderson, U.S. Pat. Nos. 4,496,473 and 4,613,452, on the other hand, recite and claim only enol ester activators. The activators are combined with nonionic surfactants to provide acidic aqueous "emulsions" which incorporate hydrogen peroxide. The Sanderson patents recite the use of the depicted enol ester activators exclusively and furthermore relate only to those emulsifiers which have HLB (hydrophile-lipophile balance) values the same as, or at least not differing appreciably from, the corresponding value for the enol ester activator or combination of enol ester activators dispersed in the composition.

Certain other art disclose stable microemulsion systems (Loth et al., U.S. Pat. No. 5,082,584 and Loth et al., U.S. Pat. No. 5,075,026), while others disclose the suspension of certain types of insoluble activators or peracids in liquid systems (Liberati et al., U.S. Pat. No. 5,073,285; Gray et al, U.S. Pat. No. 5,019,289 and Gray et al., U.S. Pat. No. 4,891,147). Finally, two references suggest the solubilization of particular peracids in essentially non-aqueous (containing less than about 5% water) surfactant solutions (Barnes et al., EP 340,000 and van Buskirk et al., EP 484,095).

However, none of the art teaches, discloses or suggests the use of colloidal dispersions to deliver stable formulations containing surface active peracid precursors, preferably those without ionizable groups.

SUMMARY OF THE INVENTION AND OBJECTS

The present invention provides liquid peracid precursor systems adaptable for the delivery of peracid oxidants in the presence of a peroxide source for bleaching or cleaning applications. The peracid precursor is stably dispersed or solubilized within a colloidal dispersion which further comprises a liquid matrix and an emulsifier, which emulsifier has an HLB appreciably different from that of the peracid precursor.

It is therefore an object of this invention to provide liquid systems for the delivery of peracid oxidants in which peracid precursors are stably dispersed or solubilized.

It is a further object of this invention to provide liquid peracid precursor systems in the form of liquid crystals to provide storage stable liquid peracid precursor/peroxide source compositions.

It is yet another object of this invention to provide liquid peracid precursor systems which can be stably combined with a source of hydrogen peroxide.

It is a still another object of this invention to provide stable liquid compositions containing acylated phenyl esters preferably without sulfonate moieties present on the phenyl leaving groups.

It is a still further object of this invention to dispense stable liquid compositions containing peracid precursors along with a liquid cleaning adjunct preferably comprising at least one alkalinity source, one detergent, one peroxide source, or a mixture thereof.

It is finally an object of this invention to co-dispense stable liquid compositions containing peracid precursors along with a separately prepared liquid cleaning adjunct, preferably comprising at least one alkalinity source, one liquid detergent, one liquid peroxygen source, or a mixture thereof.

DEFINITIONS

Figure 1:
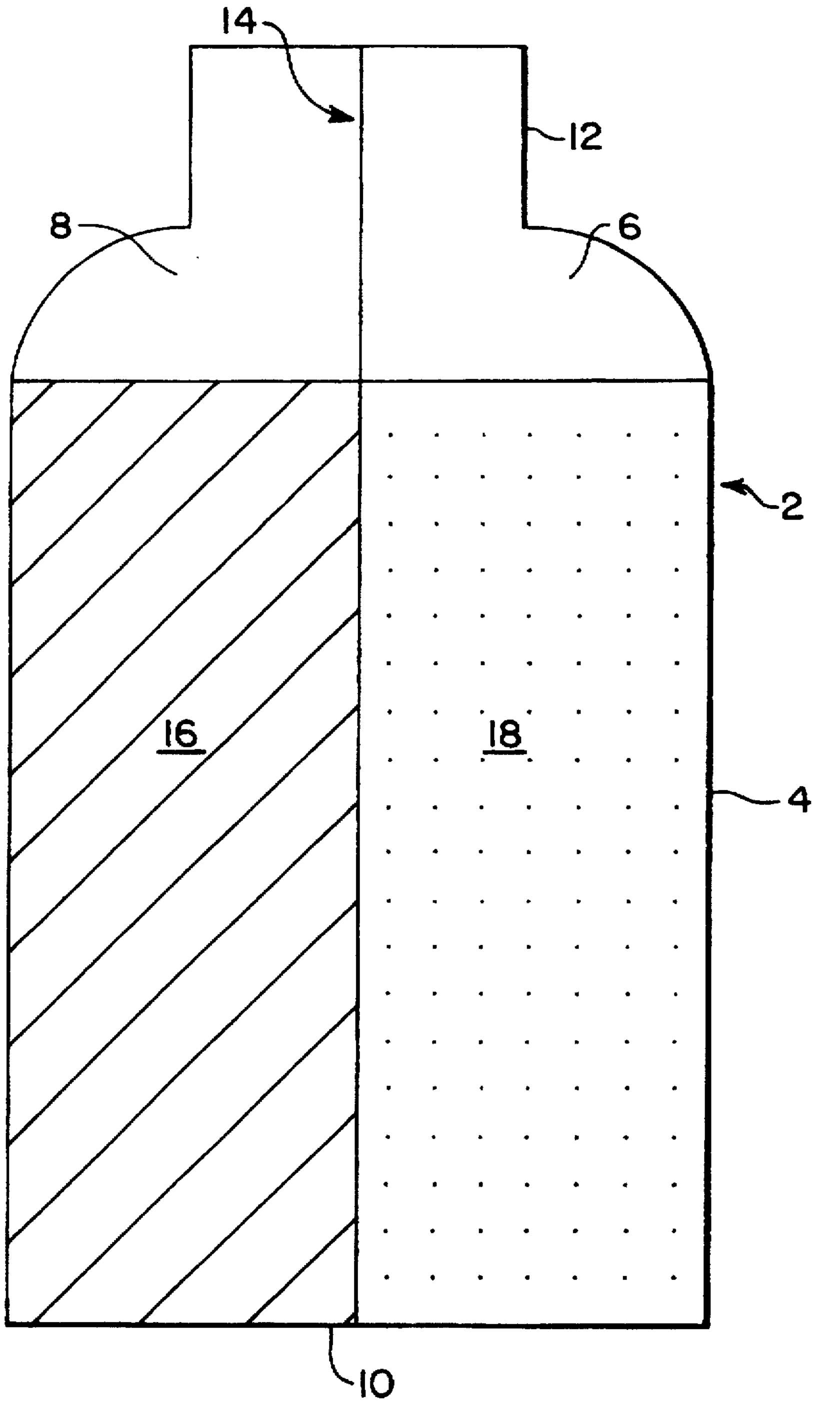
FIG. 1 is a front view of a container which can be used to enclose the colloidal dispersion compositions of the invention.

In this document, use shall be made of the following terms of art, which have the meanings as indicated below.

"Bilayer" as used herein refers to a layer of emulsifier molecules (also called "surfactant bilayer") approximately two molecules thick, formed from two adjacent parallel layers, each comprising surfactant molecules which are disposed such that the hydrophobic portions of the molecules are located in the interior of the bilayer and the hydrophilic portions are located on its outer surfaces. The term also refers to interdigited layers, which are less than two molecules thick, in which the two layers have interpenetrated, allowing at least some degree of overlap between the hydrophobic portions of the molecules of the two layers.

The term "Colloidal Dispersions" as used herein refers to a two-phase system wherein one phase consists of finely divided particles which may vary over a broad range of sizes. At the larger end, particles may be on the order of 100 microns (μm) in size while at the smaller end, particles may be on the order of 100 Ångstrom (Å) in size.

"Continuous Phase" refers to the dispersion medium or liquid matrix which solubilizes or suspends the oil phase, dispersed phase or "organic" phase of the present invention, and comprises one phase of the colloidal dispersions of the present invention. When the continuous phase consists essentially of water, the Continuous Phase may also be referred to as the "Aqueous Matrix."

"Critical Micellization Concentration" (CMC) as used herein refers to the concentration at which micelles first form in solution.

"Delivery" as used herein refers specifically to the technique(s) used for the introduction of a peracid precursor to a washing or bleaching application. (See also "Execution" below.)

The term "Dispersed Phase" refers to the phase that is discontinuously distributed as discrete particles or droplets in at least one other phase.

As used herein, the term "Electrolyte" refers to ionic compounds which alter the phase behavior of surfactants in aqueous environments by modifying the structure of water. Electrolytes have a solubility in water at 0° C., expressed as wt. % of anhydrous compounds, of ≧1. These ionic compounds can decrease the solubility limits of surfactants, lower the critical micellization concentration (CMC), and affect the adsorption of surfactants at interfaces. Electrolytes include water soluble dissociable inorganic salts such as, e.g., alkali metal or ammonium halides; nitrates; phosphates; carbonates; silicates; perborates and polyphosphates; calcium salts; and certain water soluble organic salts which desolubilize or "salt out" surfactants. The term Electrolyte includes total dissolved Electrolyte, including any dissolved Builder, if such Builder is also an Electrolyte, but excludes any suspended solid.

The term "Execution" as used herein refers to the total product formulation. A particular execution may exist in the form of either a unitary or multiple delivery, and especially a dual delivery. The unitary delivery execution may alternately be referred to as a single portion execution.

"Fabric Substantive" refers to the quality of being attracted or drawn to fabric, i.e., tending to go towards a fabric.

As used herein, a "Hydrotropic" substance refers to one that exhibits characteristics intermediary between those of both a hydrophile and a hydrophobe, however it is neither as strongly hydrophilic as a hydrophile, nor as strongly hydrophobic as a hydrophobe. See, for example, the definition of "hydrotropic bleaches" as provided by Bossu, U.S. Pat. No. 4,374,035, which is incorporated herein by reference.

The term "Liquid Matrix" is used herein to refer to the dispersion phase, continuous phase or dispersion medium of the colloidal dispersions. When the primary component of the dispersion medium is water, the Liquid Matrix may also be referred to as the "aqueous matrix."

"Lyophilic Colloids" as used herein refers to thermodynamically stable systems such as liquid crystals and microemulsions (the latter of which are oil-swollen micelles) that can spontaneously form from surfactants and water. Lyophilic colloids are "reversible" systems in that they can relatively easily be redispersed if allowed to dry out or if heat-cycled. Lyophilic colloids are unaffected by small amounts of electrolytes, but may be "salted out" by larger quantities. The surface tension of lyophilic colloids is generally lower than that of the dispersion medium alone.

As used herein, "Lyophobic Colloids" refer to thermodynamically unstable colloidal systems such as oil-core vesicles (including surfactant bilayers) and macroemulsions that are composed of particles which are insoluble in the solvent (hydrophobic if solvent is water). Lyophobic colloids are "non-reversible" systems in that it is relatively difficult to redisperse the system if it is heat-cycled or allowed to dry out. Given enough time, lyophobic colloids will ultimately form aggregates. Lyophobic colloids may be prepared by dispersion methods, i.e. grinding, milling or condensation methods, i.e. precipitate insoluble material from solution of small molecules or ions where a high rate of new phase nucleation is combined with a slow rate of nuclei growth.

"Oil-core Vesicles" as used herein pertains to those surfactant bilayer vesicles which contain emulsified oil drops at the interior of the vesicle.

The term "Organic Phase" refers to the dispersed phase in a colloidal dispersion and comprises essentially the activator and emulsifier (surfactant) together with any other organic materials incorporated therein. Contrast "Continuous Phase."

As used herein, "Solubilization" refers to a process in which micelles and inverse micelles may take up other molecules in their interior to disperse the molecules into the continuous phase.

"Spherulites" as used herein means a spherical or spheroidal body having dimensions of from 0.1 to 50 microns. Spherulites also refers to a composition in which a major part of the surfactant is present in the form of spherical or distorted prolate, oblate, pear or dumbbell shapes, which is principally stabilized against sedimentation by a spherulitic surfactant phase. The term is also used interchangeably with the term vesicle, particularly wherein certain oil-core vesicles take on a spheroidal configuration.

The term "Surface Tension" as used herein refers to that tension modulus at the air-water interface.

The term "Vesicle" is used to describe a concentric bilayer (lamella) containing an internal liquid region. Typically, the internal region comprises a water-filled cavity. In the following discussions, reference will also be made to the phrase "oil-core vesicle" to particularly distinguish those spherically concentric multilamellar aggregates which contain a hydrocarbon core.

DETAILED DESCRIPTION OF THE INVENTION

Unless specifically indicated otherwise, all amounts given in the text and the examples which follow are understood to be modified by the term "about", and those figures expressed in terms of percent (%) are understood to refer to weight-percent.

The invention provides liquid peracid precursors and peroxide sources suitably furnished in various formulations as pourable, chemically stable non-sedimenting compositions for reaction together in an aqueous wash or cleaning medium to generate peracid oxidants, also referred to herein as peroxyacids or peracids. These peracids activate and therefore enhance the bleaching capability of the peroxide sources. Unfortunately, one problem often presented by combining peracid precursors and peroxide sources together in a liquid product is that the precursors are often attacked and degraded by peroxide during storage of the liquid product, as well as by general hydrolytic processes, thus reducing the effective amount of peracid oxidant which can be delivered to a use application. This problem has been overcome in the present invention by stably combining or suspending the precursor within a dispersion medium or continuous phase comprising a liquid matrix to form a colloidal dispersion. The dispersed phase, which could also be said to be stably dispersed or solubilized within the liquid matrix, is an oil which comprises at least one peracid precursor. The continuous phase or dispersion medium comprises at least one emulsifier in a stabilizing effective amount of a liquid matrix which may additionally contain optional adjuncts such as builders, electrolytes, etc.

The peracids of the present invention are generated in situ from a suitable peracid precursor and a peroxide source (such as hydrogen peroxide or persalts). It is the peroxygen source which, upon combination with the peracid precursors of this invention, react to form the corresponding peroxyacid or peracid under appropriate conditions. Peroxyacids are advantageous bleaching agents in wash applications in that they promote better wash perform than hydrogen peroxide. Comparably speaking, the peroxyacids are stronger oxidants than hydrogen peroxide and provide better bleaching ability. The improvement in wash performance of peroxyacids over hydrogen peroxide is sufficiently recognizable so as to constitute a consumer noticeable difference.

Depending on a variety of factors, namely the types and relative concentrations of the emulsifier, bleach activator and liquid matrix, and temperature, the peracid precursor systems may be provided as one of several forms of colloidal dispersions including, without limitation, oil-core vesicles, liquid crystals, microemulsions (including oil-swollen micelles and, under certain conditions, inverse micelles) and macroemulsions. The present invention describes more fully the formation and characteristics of the liquid crystal form of colloidal dispersions. Oil-core vesicles, microemulsions and macroemulsions are treated in greater detail in co-pending applications for patent U.S. Ser. Nos. 08/449,882, 08/452,619, and 08/450,740, respectively, filed concurrently and of common assignment herewith.

I. REQUIRED ELEMENTS OF THE INVENTION

The colloidal dispersions of the present invention comprise two regions, namely the continuous and dispersed phases. The peracid precursor comprises the dispersed phase, while the emulsifier and liquid matrix comprise the continuous phase. However, in addition to the peracid precursor, emulsifier and liquid matrix, a liquid peroxide source is also necessary for perhydrolysis of the peracid precursor to form the end desired peroxy acid product for use in a wash application.

When combined with a source of hydrogen peroxide, a peracid precursor undergoes perhydrolysis to provide the corresponding peracid, which is also known as a peroxyacid, according to the general reaction:

$$\underset{\text{hydrogen peroxide}}{HOOH} + \underset{\text{ester}}{R-\overset{\overset{O}{\|}}{C}-OR'} \longrightarrow \underset{\text{peracid}}{R-\overset{\overset{O}{\|}}{C}-OOH} + R'-OH$$

From the above reaction, it can be seen that it would be advantageous to form desired peroxyacids only as needed, as peroxyacids formed prematurely can be unstable and degrade over time in traditional liquid formulations. Moreover, peroxyacids can also be deleterious to surfactants, additional precursors, brighteners, fragrances, and other remaining formulation components upon standing in a bottle or storage container over time. Therefore, it is an important feature of the present invention that the colloidal dispersions feature a mechanism for the long-term stable storage and delivery of a peracid precursor to a wash application, even in the presence of peroxide, while simultaneously preventing formation of the peracid product until such time as its generation is desired.

Although the peroxide source is essential to the invention, it may constitute either part of the colloidal dispersion or a separately contained, but co-delivered liquid component. The required elements of the invention are therefore a peracid precursor, emulsifier, liquid matrix and peroxide source, each of which are discussed in greater detail below.

A. PERACID PRECURSOR

The dispersed phase of the present invention comprises at least one peracid precursor. In addition, the dispersed phase may optionally contain other adjuncts such as "codispersants" which are discussed in greater detail below. Peracid precursors, otherwise known as "peroxygen bleach activators" or simply "activators" are typically acylated organic compounds. Especially preferred peracid precursors are esters. The preferred esters are phenyl esters and substituted polyglycoyl esters.

In general, peracids which are generated from the various peracid precursors described herein preferably have the structure corresponding to Formula I in the case of a monoperoxyacid precursor:

$$Q-\overset{\overset{O}{\|}}{C}-O-OH \qquad \text{Formula I}$$

where Q=the residual portion of a hydrocarbon moiety in the case of a multi-functional ester group and is discussed in greater detail below. Where the bleach activator precursor is a di-peracid precursor, preferred peracids generated according to the present invention may have the structure corresponding to Formula II:

$$HO-O-\overset{\overset{O}{\|}}{C}-(CH_2)_n-\overset{\overset{O}{\|}}{C}-O-OH \qquad \text{Formula II}$$

where n is from 4 to 18 (i.e., 6 to 20 total carbon atoms in the chain).

It has been found that one particularly preferred category of phenyl ester peracid precursors are those optionally having no ionizable (e.g. sulfonate) groups and which provide, upon perhydrolysis, either hydrotropic or hydrophobic peroxyacids or mixtures thereof. Hydrophobic peracids are also known as surface active peracids. A description of these two types of peracids and activators capable of generating them may be found in Bossu, U.S. Pat. No. 4,391,725, or Mitchell, U.S. Pat. Nos. 5,130,044 and 5,130,045, respectively, all of which are incorporated herein by reference thereto. Hydrophobic and hydrotropic peracids have the advantage of being fabric substantive and, unlike water soluble peracids, should concentrate bleaching action on or near the fabric surface, so as to facilitate improved fabric cleaning. On the other hand, water soluble or hydrophilic peracids provide solution bleaching and have different advantages.

The preferred peracid precursors range in solubility from being generally water insoluble to having limited water solubility. This characteristic is important since it is desirable to forestall the precursor's action, especially in an aqueous matrix. The precursor comprises at least part of the "water-immiscible oil" in the oil-in-water type colloidal dispersions of the invention. Surprisingly, the peracid precursors exhibit surprising physical and chemical stability when incorporated into the liquid aqueous systems of the invention. This was most unexpected, as most of the prior art literature teaches that liquid peracid precursors are expected to be hydrolytically unstable.

The amount of the peracid precursor used is about 0.1% to about 35% by weight, more preferably about 0.5% to about to 25% by weight, and most preferably about 1% to about 10% by weight of the colloidal dispersion.

A.1. Phenyl Esters.

Specific phenyl ester peracid precursors found to be suitable candidates for use in the liquid systems of the invention are:

A.1.a. Phenyl esters having no ionizable groups

Phenyl esters having no ionizable groups, for example, phenyl esters of alkanoylglycolic acids or phenyl esters of carboxylic acids, may be represented as:

$$R-\overset{O}{\overset{\|}{C}}-O-CH_2-\overset{O}{\overset{\|}{C}}-O-Ø \text{ and } R^1-\overset{O}{\overset{\|}{C}}-O-Ø$$

wherein R and $R^1$ are straight or branched chain $C_{1-20}$ alkyl or alkenyl, and Ø is phenyl ($C_6H_5$). Peracid precursors which may be formed upon perhydrolysis of the above would give rise to peroxyacids having the general structure corresponding to Formula I above, wherein Q may be R—C(O)—O—$CH_2$-or $R^1$, and further wherein R and $R^1$ are defined as above.

Certain of the alkanoylglycoylbenzene compounds are described and claimed in Fong et al., U.S. Pat. No. 4,778,618 and U.S. Pat. No. 4,959,187, and also described in Ottoboni, et al., U.S. Ser. No. 08/194,825 filed 14 Feb. 1994, entitled "Method for Sulfonating Acyloxybenzenes and Neutralization of Resulting Product," of common assignment herewith, and incorporated by reference thereto. However, the preferred compound of the two patents, the alkanoyloxyacetyl-phenylsulfonate (also known as alkanoylglycoylphenylsulfonate or "AOGPS"), is not preferred herein. Applicants speculate, without being bound by theory, that the sulfonyl group on the compound, which sulfonyl group is a common solubilizing group, may make the compound more hydrolytically unstable in solution, and in aqueous solution in particular.

Preferred alkanoylglycoylbenzene compounds are listed below with preferred alkyl chain lengths:

| R moiety | Name of Compound |
|---|---|
| $C_5$ | Hexanoylglycoylbenzene |
| $C_6$ | Heptanoylglycoylbenzene |
| $C_7$ | Octanoylglycoylbenzene |
| $C_8$ | Nonanoylglycoylbenzene |
| $C_9$ | Decanoylglycoylbenzene |
| $C_{10}$ | Undecanoylglycoylbenzene |
| $C_{11}$ | Dodecanoylglycoylbenzene |

An especially preferred alkanoylglycoylbenzene is nonanoylglycoylbenzene ("NOGB"), which has proven to be desirable because of proficient performance and relative ease of manufacture. It produces surface active peracids when combined with a source of hydrogen peroxide in a cleaning or washing application, which peracids can significantly boost the cleaning performance compared to that of the peroxide source alone.

The alkanoyloxybenzene compounds, on the other hand, can result from reacting chloroacetyl chloride, phenol and a carboxylic acid, and is the subject of separately co-pending and concurrently filed application Ser. No. 08/450,162, L. D. Foland et al., entitled "Process for Preparing Phenyl Esters," which is incorporated herein by reference thereto. The most desirable chain lengths conform to those described above for the alkanoylglycoylbenzenes.

A.1.b. Phenoxyacetyl compounds.

Phenoxyacetyl compounds, such as, without limitation, those disclosed in Zielske et al., U.S. Pat. No. 5,049,305, U.S. Pat. No. 4,956,117 and U.S. Pat. No. 4,859,800, all of which are incorporated herein by reference thereto. Preferred compounds are phenoxyacetyl phenols, with the structure:

$$R^2-(C_6H_4)-O-CH_2-\overset{O}{\overset{\|}{C}}-O-Ø$$

wherein $R^2$ can be either H or $C_{1-5}$ alkyl; and Ø is phenyl ($C_6H_5$). These types of compounds can be synthesized by modifying Example IA of U.S. Pat. No. 5,049,305, for instance, by substituting a molar equivalent of phenol, for the recited p-phenol sulfonate. In one preferred embodiment of the invention, $R^2$ is H (phenoxyacetyloxybenzene; PAOB, also known as "PAAP"). Peracid precursors which may be formed upon perhydrolysis of the above general structure for phenoxyacetyl phenols would give rise to peroxyacids having the general structure corresponding to Formula I above wherein Q is $R^2$—($C_6H_4$)—O—$CH_2$—and further wherein $R^2$ is defined as above.

A.1.c. Phenyl esters of dicarboxylic acids

Certain diperoxy compounds which are suitable for use as precursors of the diperacids shown in Formula II are further explained and described in Zielske, U.S. Pat. No. 4,735,740, which is incorporated herein by reference. However, the sulfonate compounds taught and explained in the '740 patent to Zielske are not as preferred as their corresponding non-sulfonated analogs. Phenyl esters of dicarboxylic acids such as, without limitation, those described in Zielske, U.S. Pat. No. 4,735,740, incorporated herein by reference thereto. Preferred compounds are diphenyl esters of dicarboxylic acids, with the structure:

$$Ø-O-\overset{O}{\overset{\|}{C}}-(CH_2)_n-\overset{O}{\overset{\|}{C}}-O-Ø$$

wherein n is about 4 to 18. These types of compounds can be synthesized by modifying, e.g., Example IA of U.S. Pat. No. 4,735,740, to use a molar equivalent of phenol instead of the anhydrous phenol sulfonate used therein. The types of peracids generated by these compounds are hydrotropic peracids, and would exhibit the general diperoxide structure corresponding to Formula II above wherein n is as defined above.

A.1.d. Mono- and diesters of dihydroxybenzene

Mono- and diesters of dihydroxybenzene such as, without limitation, those described in Fong et al., U.S. Pat. No. 4,964,870 and incorporated herein by reference thereto are also suitable for use as peracid precursors of the present invention. Preferred compounds are diacyl esters of resorcinol, hydroquinone or catechol, having the structure:

$$R^3-\overset{O}{\overset{\|}{C}}-O-(C_6H_4)-O-\overset{O}{\overset{\|}{C}}-R^4,$$

wherein $R^3$ and $R^4$ can be $C_{1-20}$ alkyl, but, more preferably, one substituent is $C_{1-4}$ and the other is $C_{5-11}$, or both are $C_{5-11}$. In the instance where either $R^3$ or $R^4$ is $C_{1-4}$ and the other is $C_{5-11}$, advantageously two different types of liquid peracids can be generated, one being surface active, the other being water soluble. These types of compounds can be manufactured as taught in said U.S. Pat. No. 4,964,870, as well as from the description contained in Fong et al., U.S. Pat. No. 4,814,110, incorporated herein by reference thereto. Peracid precursors which may be formed upon perhydrolysis of the above general structure for phenoxyacetyl phenols would give rise to peroxyacids having the general structure corresponding to Formula I above wherein Q may be $R^3$ or $R^4$ as defined above.

A.1.e. Esters of substituted succinates

Diesters of succinic acid having structures corresponding to the general formula below (as recited in Hardy, et al., U.S. Pat. No. 4,681,592 and incorporated herein by reference thereto) may also be used:

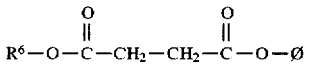

wherein $R^6$ can be $C_{1-20}$ alkyl, preferably $C_{5-11}$. In one preferred embodiment of the invention, $R^6$ is hexyl ($C_6$).

A.1.f. Carbonate esters

Phenyl esters of carbonic acids having structures corresponding to the general formula below (as recited in Jakse, et al., U.S. Pat. No. 5,183,918 and incorporated herein by reference thereto) may also be used:

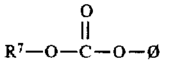

wherein $R^7$ can be $C_{1-20}$ alkyl, preferably $C_{5-11}$, or a mixture thereof. In one preferred embodiment of the invention, $R^7$ is a mixture of $C_7$ and $C_9$.

A.2. Substituted Polyglycoyls

Another preferred group of esters according to the colloidal dispersions of the present invention are substituted polyglycoyl esters, such as those disclosed by Rowland, et al., U.S. Pat. Nos. 5,391,812 and 5,182,045, both of which are incorporated herein by reference thereto. Preferred compounds are, e.g.:

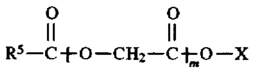

wherein $R^5$ is a straight or branched chain $C_{1-20}$ alkyl or alkenyl, m is between about 1.5 and 10, and X may be selected from among the following: H; alkali metal including, without limitation, Li, K, Na; alkaline earth including, without limitation, Mg, Ca, Be; ammonium; amine; phenyl; and $C_{1-4}$ alkyl. In one embodiment of the invention, $R^5$ is preferably $C_{5-14}$. See also, Nakagawa et al., U.S. Pat. No. 3,960,743, incorporated by reference thereto. Peracid precursors which may be formed upon perhydrolysis of the above substituted polyglycols would give rise to peroxyacids having the general structure corresponding to Formula I above wherein Q is $R^5—[C(O)—O—CH_2]_m—$ and further wherein m and $R^5$ are defined as above.

In the inventive colloidal dispersions, it is preferred to deliver about 0.05 to 50 ppm active oxygen (A. O.) from the peracid precursor, more preferably 0.05 to 25 ppm A. O. and most preferably about 0.1 to 15 ppm A. O. The amount of liquid peracid precursor required to achieve this level of A. O. ranges from about 0.05 to 50 wt. %, more preferably about 0.1 to 25 wt. % and most preferably about 0.1 to 15 wt. %. Peracid precursor quantities towards the higher end of each range would probably be most helpful for those product formulations in which the peroxide source is contained within the same delivery portion as the colloidal dispersion (see below).

B. EMULSIFIER

Emulsifiers are typically compounds based on long-chain alcohols and fatty acids, which can reduce the surface tension at the interface of suspended particles because of the solubility properties of their molecules. Emulsifiers contain both a non-polar hydrophobic (lipophilic) or a hydrotropic portion comprised of aliphatic or aromatic hydrocarbon residues and a polar hydrophilic (lipophobic) portion comprised of polar groups which can strongly interact with polar solvents such as water. Typical emulsifiers are surface-active agents or surfactants.

The continuous phase of the inventive colloidal dispersions comprise at least one liquid emulsifier in solution with a liquid matrix. Additional optional ingredients such as builders and electrolytes may also be included. The emulsifier is typically a compound that is either hydrophobic or hydrotropic, although hydrophobic compounds are generally preferred. Preferred emulsifiers are surfactants, of which nonionic surfactants are especially preferred. Depending upon the surfactant which is used, different stabilities may result for a particular activator at similar conditions of temperature, pH, concentration, etc.

In the past, parameters such as HLB values have been calculated for surfactants and bleach precursors and compared in an effort to determine a priori the most appropriate surfactants to use in order to optimize the stability of compounds combined therewith. According to one well-established technique, a value for the HLB of a particular substance may be determined by the following:

$$HLB=\Sigma(\text{hydrophilic group contributions})+\Sigma(\text{lipophilic group contributions})+7$$

(see Popiel, W. J., *Introduction to Colloid Science*, Exposition Press, Hicksville, N.Y. (1978), p.43–44.) Using the group contributions provided by Gerhartz, W., ed., *Ullmann's Encyclopedia of Industrial Chemistry*, 5th Ed. vol. A9, VCH Publishing (1985) p. 322–323, a calculation of the HLB value for nonanoylglycoylbenzene ("NOGB") would give the following:

$$HLB\ (NOGB)=2x(\text{free ester})+8x(—CH_2—)+(CH_3)+(\text{phenyl})+7$$

$$HLB\ (NOGB)=2x(2.4)+8x(-0.475)+(-0.475)+(-1.662)+7=5.863=5.9$$

Similarly, the following result would be obtained for nonanoyloxybenzene ("NOB"; also known as phenyl nonanoate):

$$HLB\ (NOB)=(\text{free ester})+7x(CH_2—)+(—CH_3)+(\text{phenyl})+7$$

$$HLB\ (NOB)=2x(2.4)+7x(-0.475)+(-0.475)+(-1.662)+7=3.938\approx3.9$$

Taking the ramification of these calculations one step further, according to the two Sanderson patents mentioned above (U.S. Pat. Nos. 4,496,473 and 4,613,452), it would be expected that the most stable surfactant systems for NOGB and NOB would be those which had similar HLB values. In the Sanderson references, this technique was apparently useful for finding appropriate surfactants for the recited enol esters. By analogy then, HLB values of 5.9 and 3.9 for NOGB and NOB, respectively, should give the best results here.

However, it is generally well-established that HLB values below 6, specifically those between 3.5 to 6, are characteristic of water-in-oil emulsions (see Davies, J. T. and Rideal, E. K., "Interfacial Phenomena", 2nd ed., Academic Press, N.Y. (1963), p. 373). Having carried out the appropriate HLB calculations given above, Applicants were therefore surprised to learn, first, that liquid surfactants that gave HLB values appreciably similar to those of NOGB and NOB for the examples cited above did not result in stable colloidal dispersions (macroemulsions). By "appreciably similar", Applicants intend it to be understood that a first HLB value is within 1 unit, plus or minus, of a second HLB value. In fact, by strict HLB convention alone, the correct surfactant (s) to use for NOB or NOGB should exhibit HLB values below about 6. It would have been predicted that the most suitable form for stabilizing these bleach activators would be to form water-in-oil emulsions, which exhibit characteristic HLB values from 3.5 to 6.0. Second, and perhaps even more surprising, it was learned that by using surfactants with HLB values above 8, Applicants could form stable oil-in-water type colloidal dispersions, which systems generally exhibit HLB values above 8, typically from 8 to 18. In fact, several of Applicants' most stable colloidal dispersions were formed with surfactants having HLB values above 10. It is therefore desirous to use surfactants whose HLB values, alone or in combination, vary from about 10 to about 14, more preferably from about 10.2 to about 13.7, and most preferably from about 10.4 to about 13.3. In one preferred embodiment of the present invention, the HLB value for the surfactant is between about 10.6 to about 13.0.

The type of emulsifier also plays an important role in determining the most appropriate surfactant to be used to stabilize a particular peracid precursor. Mixtures of SPAN 20 (nonionic surfactant available from ICI Surfactants) and TWEEN 20 (polyoxyethylene (20) sorbitan monolaurate also available from ICI Surfactants) in various proportions were evaluated for their ability to stabilize peracid precursor macroemulsions, for example, with marginal success. On the basis of HLB numbers, the SPAN 20/TWEEN 20 mixtures should have been good emulsifiers to use.

Surfactants which may be used in the colloidal dispersions of the present invention, and which provide the desired range of HLB values, may be selected from the group consisting of nonionic, anionic, cationic, amphoteric and zwitterionic surfactants, or a combination thereof, although it is preferred that at least one nonionic surfactant be used. Nonionic surfactants which may be used in accordance with the teaching of the present invention include, but are not necessarily limited to: alkoxylated alcohols; alkoxylated ether phenols; alkoxylated mono-, di, or triglycerides; polyglycerol alkylethers; alkyl polyglycosides; alkyl glucamides; sorbitan esters; and those depicted in *Kirk-Othmer, Encyclopedia of Chemical Technology*, 3rd ed., Volume 22, pp. 360–377 (Marcel-Dekker, 1983), which are incorporated herein by Terence. The alkoxylated alcohols include ethoxylated, and ethoxylated and propoxylated $C_{6-16}$ alcohols, with about 2–10moles of ethylene oxide, or 1–10 and 1–10 moles of ethylene and propylene oxide per mole of alcohol, respectively.

Suitable examples of alkoxylated alcohols include the NEODOL® from Shell Chemical Company: NEODOL® 91-6,23-6.5,25-3,25-7 and 23-5, with NEODOL® 25-3 and 25-7 somewhat preferred. Alkoxylated phenol ethers include both ethoxylated nonyl and octylphenol ethers, such as: TRITON® X-100/X-35, X-101, N-100, N-101 and N-57 (Union Carbide Corp.); T-DET 0-9 and T-DET 0-6 (Harcros Chemicals, Inc.); and the like. Other suitable surfactants include alkoxylated mono-, di- and triglyceride surfactants. Exemplary of such surfactants are $C_{10-20}$ alkyltriglycerides with 10–50 moles of ethylene oxide per alkyl group, of which ETHOX® CO-16, CO-25, CO-30, CO-36, CO-40, all ethoxylated castor oils from Ethox Chemical, are preferred. A mixture of HCO-25 (partially hydrogenated) or CO-25 and CO-200 is especially preferred. ETHOX® CO-200 is usually added after the colloidal dispersion is formed, as it seems to assist in maintaining stability.

Other nonionic surfactants which may be used include: TAGAT TO (Goldschmidt Chemical Corp.), TWEEN 85 (ICI Surfactants), and EMULPHOR TO-9 (Rhone-Poulenc/GAF). Other surfactants which may be used are block copolymers of propylene oxide and ethylene oxide known under the trade name of PLURONIC® (BASF Corp.). Anionic surfactants which may be used include, in particular, BIOSOFT® (Stepan). Cationic, amphoteric and zwitterionic surfactants, as well as other nonionic and anionic surfactants which may be used are those described in *Kirk-Othmer, Encyclopedia of Chemical Technology*, 3rd ed., Volume 22, pp. 332–432 (Marcel-Dekker, 1983), which are incorporated herein by reference. The surfactant comprises about 2% to 40% by weight, more preferably about 2.5% to 30% by weight, and most preferably about 5% to about 25% by weight of the total colloidal dispersion. The surfactant which may be used may be selected from the group consisting of nonionic, amphoteric or zwitterionic surfactants, or a combination thereof, although it is preferred that at least one nonionic surfactant be used.

C. LIQUID MATRIX

The liquid matrix comprises the dispersion phase, also called continuous phase or dispersion medium of the inventive colloidal dispersions. When the primary component of the dispersion medium is water, the liquid matrix is also referred to as an "aqueous matrix."

While water is a plentiful, cheap diluent, it also provides a reaction medium in which hydrolyzable compounds, such as peracid precursors, can decompose. This is because those peracid precursors which readily react with hydrogen peroxide in the wash (by nature of their lack of steric hindrance or absence of deactivating groups) are also vulnerable to attack by hydroxide or hydronium ions present in water. For example, hydroxide ion can nucleophilically attack the phenyl esters cited above, resulting in phenol and carboxylic acids which are inert toward activating hydrogen peroxide. By mechanisms which are well known to those learned in the art, acidic matrices can likewise degrade these phenyl esters.

For the foregoing reasons, it is quite surprising that the inventive colloidal dispersions can stably solubilize the peracid precursors of the invention even in the presence of an aqueous liquid matrix. In addition to water, which is generally the predominant component of the continuous phase, the liquid matrix may also be comprised of other substances such as, but not necessarily limited to, cosurfactants or organic solvents, and surfactants.

Cosurfactants according to the present invention are hydrophilic components which are mixed with a surfactant in order to modify the phase behavior of the surfactant, particularly in its interactions with water-immiscible oils (such as the peracid precursors). The cosurfactant alone would not function efficiently as a surfactant, but are useful in modulating properties of the surfactant in a controlled manner in order to improve the surfactant's performance in stabilizing colloidal dispersions, forming microemulsions, or wetting interfaces. Examples of suitable cosurfactants and organic solvents are: alcohols such as butanol, pentanol, or hexanol; esters; and ketones, as well as many other materials. The term is commonly, although not exclusively, associated with alcohols.

When water is the primary component of the liquid matrix, it generally comprises at least about 50%, more preferably at least about 60% and most preferably at least about 75% of the weight of the total colloidal dispersion. In the case of normal ("dilute") product formulations, water comprises at least 90% by weight of the total colloidal dispersion. For "concentrated" product formulations, water comprises at least 80% by weight of the total colloidal dispersion. According to another embodiment of the present invention, the liquid matrix consists essentially of water. Deionized water is most preferred.

In certain instances, it may also be possible to form "inverted micelle" forms of colloidal dispersions. This would arise where the liquid matrix constitutes a relatively small percentage of the total colloidal dispersion such that the chief components of the colloidal dispersion are the peracid precursor and emulifier molecules. In this "inverted" situaton, the emulsifier molecules would form molecular aggregates in which water molecules were concentrated at the center of a micelle formed when hydrophobic or hydrotropic portions of emulsifier molecules projected outward from the aqueous center of the aggregate in which the hydrophilic portion of the emulsifier molecules were concentrated. This "water-swollen inverted micelle" type of structure would exhibit many characteristics similar to those normally found for microemulsion colloidal dispersions. (See co-pending application U.S. Ser. No. 08/452,619, referenced above.)

D. PEROXIDE SOURCE

The peracid precursor, emulsifier and liquid matrix together constitute the core components required for a colloidal dispersion according to the present invention. However, as indicated above, peracids of the present invention are generated in situ from a suitable peracid precursor and a suitable peroxide source. Depending upon the components used and their relative amounts, the peroxide source may either be contained within the inventive colloidal dispersions, or may be maintained in a separate liquid delivery portion using a variety of techniques also referred to herein as executions. The peracid precursor, emulsifier, liquid matrix and peroxide source along with any optional ingredients or adjuncts also constitute the components of a product formulation according to the present invention.

According to one embodiment of the present invention, the peroxide source may be stably combined together with the peracid precursor, emulsifier and liquid matrix as part of the inventive colloidal dispersions. When the peroxide source is thus combined, the colloidal dispersion-containing peroxide source constitutes one form of execution for the inventive colloidal dispersions referred to herein as a "unit delivery form", or simply a unitary execution. Alternately, the peroxide source may be separately maintained as part of a multiple delivery form, most preferably a "dual delivery form", or dual execution.

A number of different delivery execution forms may be convenient for use, four of which are presented in Table I below. The group of items listed under the heading "First Portion" in each Execution form of Table I indicates the required components for a different embodiment for the colloidal dispersions of the present invention. That is, in Execution I (unit delivery), the colloidal dispersion is comprised of a precursor, surfactant, liquid, peroxide source and optionally, a buffer, along with any desired optional adjuncts. No Second Portion is required for this execution. In Execution form III (dual delivery), the colloidal dispersion of the First Portion of the execution comprises a peracid precursor, surfactant, liquid and peroxide source. A suitable liquid alkalinity source (buffer) is found in a Second Portion. Naturally, any optionally desired adjuncts may also be included in the First Portion or Second Portion of Execution III. Regardless of the Execution used, formation of the peroxyacid from the peracid precursor and the peroxide source commences upon mixing or dilution of the delivery portion components into a wash liquor.

As mentioned above, it is especially surprising that hydrogen peroxide can be combined with peracid precursor-containing colloidal dispersions of the invention in the same portion of a delivery execution and not unduly impair the stability of the peracid precursor, while nevertheless delivering a concentration sufficient to activate the peracid precursor under bleaching or washing conditions.

TABLE I

| | Delivery Executions | |
|---|---|---|
| Execution | First Portion (Colloidal Dispersion) | Second portion |
| Unit delivery (I) | Peracid precursor + Surfactant + Liquid matrix + Peroxide source + Buffer (optional) | |
| Dual delivery (II) | Peracid precursor + Surfactant + Liquid matrix + Buffer (optional) | Peroxide source |
| Dual delivery (III) | Peracid precursor + Surfactant + Liquid matrix + Peroxide source | Buffer |
| Dual delivery (IV) | Peracid precursor + Surfactant + Liquid matrix | Peroxide source + Buffer |

In certain embodiments of the invention in which the peroxide source and peracid precursor are contained within the same delivery portion, the peroxide does not degrade or decompose the peracid precursor to an appreciable or unacceptable extent even though the two species are present together. Applicants speculate, without being bound by theory, that one reason for this stability may be that the pH of the delivery portion is too acidic to stabilize the intermediate in the $S_N1$ nucleophilic attack of a peroxide source on a peracid precursor. As a result, under acidic conditions no appreciable degradation of the peracid precursor takes place even if the activator and the peroxide source are contained within the same aqueous matrix. However, this theory alone would not explain the chemical stability observed for the various colloidal dispersions. Another situation in which degradation of the peracid precursor could be kept to a minimum would arise if the precursor were not emulsified, i.e., protected from the continuous phase by being concentrated in the oil phase. However, the latter would not result in a particularly effective product and is therefore not preferred. Without being bound by theory, Applicants believe that in certain of the inventive colloidal dispersions, the oil-soluble activator is simply not available to the peroxide source, the reason being that it is insufficiently soluble in the liquid matrix and therefore unavailable for hydrolysis or perhydrolysis until dilution of the colloidal dispersion in the wash application.

Peracid precursors and peroxide sources do not have to be maintained in separate delivery portions and may be contained within the same colloidal dispersion when L in Equation I is less than 50%, more preferably less than 40%, and most preferably less than 35% after storage at 100° F. for approximately 4 weeks.

$$L = \frac{P_0 - P_1}{P_0} \times 100\% \qquad \text{Equation I}$$

where L is the loss of peracid precursor expressed as a percent; $P_0$ is the amount of peracid precursor present at initial time $t_0$; $P_t$ is the amount of peracid precursor present at later time $t_1$; and further wherein $t_1-t_0$=approximately 4 weeks. In one preferred embodiment of the invention, L is 80% after 8 weeks at 100° F., and in a more preferred embodiment of the invention, L is 60% after 8 weeks at 100° F. When L in Equation I for a given elapsed time is small (i.e. 25% after 8 weeks at room temperature), it is possible to contain the peroxide source and peracid precursor in the same colloidal dispersion as described above under the discussion of unitary delivery executions. When L is large for a given elapsed time, it is preferable to use one of the dual delivery executions.

Liquid crystals are one type of colloidal dispersion for which the dual delivery executions are particularly preferred. As shown in Table II below, unitary delivery executions in which peroxide-containing liquid crystals are formed exhibit behavior suggestive of chemically unstable systems. After storage at room temperature, or being raised to elevated temperatures, it was found that liquid crystal colloidal dispersions containing peroxide sources exhibited clouding and/or phase separation. The clouding or phase separation behavior suggests that some form of chemical decomposition has taken place among the individual components of the colloidal dispersion. In fact, the data in Table II indicate that there was less peracid precursor available in the peroxide-containing samples after storage at room temperature for 7 days, in contrast with the control sample which contained no peroxide source.

When the execution of the present invention involves a dual delivery, the colloidal dispersion may be contained in one chamber of an at least two-chambered vessel or bottle. The second chamber may contain a liquid detergent formulation, a liquid peroxygen bleach composition, or, most preferably, a liquid buffer, especially an alkalinity source. In one preferred execution, the two chambers can be of co-equal volume such that the user preferably pours the two liquids out of their respective chambers using the same pouring angle and maintains the chambers in the same plane.

Referring now to FIG. 1 of the Drawing, a bottle or container 2 is depicted, said bottle having a body 4 comprising two chambers 6 and 8, an end wall or panel 10, and a depending finish or neck 12. A closure (not shown) could, of course, be combined with the finish, to seal the bottle contents from the environment (typically, the closure and finish are provided with mating threads, although bead and tab and other sealing means are possible). The chambers 6 and 8 can be formed by partitioning bottle 2 with a median wall 14. One chamber holds first portion 16, the inventive peracid precursor-contained colloidal dispersion, of a delivery execution according to the invention, the other chamber holds second portion 18 of the delivery execution. Together, first portion 16 and second portion 18 comprise one product formulation according to the invention. Rather than partitioning the bottle into chambers, one could also injection mold two separate chamber halves and attach the halves by adhering them or the like. Alternately, the chamber halves could be co-blowmolded by having a diehead capable of blowing dual parisons into a mold, with that portion of the one parison wall coming in contact with the other forming the partition. An equivalent of the dual chambered container would be to provide two separate containers containing, respectively, a first portion containing the peracid precursor composition and a second portion containing the remainder of the dual delivery formulation.

However, if the concentrations of either of the two delivery portions differed, for example, in an execution in which the buffer was contained in a first portion and the precursor colloidal dispersion were concentrated in a second portion, then unequal but proportional amounts of liquids can be co-metered from the bottle. One such execution is described in Beacham et al., U.S. Pat. No. 4,585,150, of common assignment, and incorporated herein by reference thereto.

Peroxide sources which are suitable for use in the present invention are any of those which can generate a peroxy anion. In addition to using hydrogen peroxide ($H_2O_2$), it may also be possible to generate hydrogen peroxide in situ in certain circumstances, for example, by maintaining the insolubility of inorganic peroxygen compounds, such as sodium perborate or percarboante, in the aqueous matrix (see, e.gs., Peterson et al., EP 431,747, in which perborate is maintained insoluble in an aqueous detergent by the use of alkali metal chlorides, borax or boric acid; De Buzzacarini, EP 293,040, and Geudens, EP 294,904, all of which are incorporated herein by reference). Suitable peroxide sources therefore include, but are not necessarily limited to: hydrogen peroxide; perborate percarbonate such as sodium percarbonate; persulfate such as potassium monopersulfate; adducts of hydrogen peroxide such as urea peroxide; as well as mixtures of any of the foregoing, etc.

As sodium perborate is available commercially in powder form and generates peroxide upon aqueous dissolution, it may be preferred to use hydrogen peroxide as the peroxide source. In addition to being more convenient to use, liquid hydrogen peroxide also currently represents a cost savings over sodium perborate which must be dried in order to be used in powder form.

The amount of hydrogen peroxide or peroxide source used should be sufficient to deliver about 0.1% to about 25%, more preferably about 0.5% to about 15%, and most preferably about 1.7% to about 4.4% hydrogen peroxide for admixture with the peracid precursor, regardless of the form of delivery execution employed.

II. OPTIONAL ADJUNCTS

The colloidal dispersions of the present invention may optionally contain certain adjuncts in addition to the required elements described above. Suitable examples of adjuncts which may be included in the present invention include, without limitation, buffering agents (including alkalinity sources), chelating agents, codispersants, surfactants, enzymes, fluorescent whitening agents (FWA's), electrolytes, builders, antioxidants, thickeners, fragrance, dyes, colorants, pigments, etc., as well as mixtures thereof.

A. Buffering Agents

Under acidic conditions (i.e. pH less than approximately 5), the peracid precursors of the present invention are rather stable and hydrolyze slowly in an aqueous liquid matrix, while under alkaline conditions, the peracid precursors will normally hydrolyze more rapidly and become degraded. It is therefore desirable to provide a somewhat acidic environment for the peracid precursor-containing colloidal dispersions, especially those in which the liquid matrix is essentially aqueous in nature. It is possible, therefore, depending upon the components used and the type of execution desired, to incorporate buffering agents either in a first portion of a delivery execution in which the colloidal dispersion is contained, or in a second portion of a delivery execution either alone, in combination with a peroxide source, or in combination with other suitable or desired adjuncts.

In colloidal dispersions that form part of a unitary delivery execution, the bleach activator may be stable to peroxide either because there is not much water in the liquid matrix, or because the formulation is not highly aqueous in nature. However, optimal stability for the peracid precursor under these conditions is generally found at low pH. It is therefore preferred that the colloidal dispersion be acidified or buffered to bring the pH of the colloidal dispersion down to a pH of less than 7, more preferably less than 6 and most preferably less than 5. In one embodiment of the present invention, the pH is maintained over a narrow range of from about pH 2 to about pH 5. Examples of suitable acids include sulfuric, sulfurous, phosphoric and hydrochloric acids.

In product formulations in which a peracid precursor contained in a first delivery portion is co-dispensed with a peroxide source comprising a second delivery portion, any optional buffering compounds to be included with the first delivery portion should be chosen such that the resulting first portion is not too acidic. Assuring that the first delivery portion not be too acidic is important in order that generation of the peroxyacid from the peracid precursor not be hindered upon the delivery of the formulation to the bleaching or cleaning application. Other factors which should be taken into consideration include the rate of peracid generation versus the rate of peracid decomposition. If the pH of the colloidal dispersion is too low, not enough peracid will be formed upon delivery of the precursor to the wash application. If, on the other hand, the pH is too high, the peracid can be formed too quickly and decompose in the wash liquor. Below pH 9, yields of the perhydrolysis product are typically less than 10%. The pH can be made more alkaline by use of suitable buffers, examples of which for use with the colloidal dispersions include, without limitation, alkali metal silicates, alkali metal phosphates, alkali metal hydroxides, alkali metal carbonates, alkali metal bicarbonates, alkali metal sesquicarbonates, phthalic acid and alkali metal phthalates, boric acid and alkali metal borates, and mixtures thereof. Sodium silicate is preferred.

While it is helpful to maintain the pH of the colloidal dispersion below pH 7 for storage and stability purposes, it is equally important that the pH of the wash application in which the peroxyacid is to be generated is sufficiently basic. In order to maintain the pH in the desired range, it has been found advantageous to incorporate a buffer such as an alkaline moiety with the second portion of a dual delivery execution, which buffer is co-dispensed with the inventive colloidal dispersion in a first delivery portion. The alkaline moiety has been observed to improve the performance of certain peracid precursors, especially nonanoylglycoylbenzene and nonanoyloxybenzene, when the precursor and hydrogen peroxide react to form the desired peroxyacids (nonanoylperglycolic acid and pernonanoic acid, respectively), in aqueous wash media, according to preferred embodiments of the invention. Different species may be used in order to lower the pH of the colloidal dispersions to acceptable pH levels.

In order to realize beneficial effects in washing applications, the pH of the colloidal dispersion should therefore be maintained such that the yield of perhydrolyzed precursor upon delivery of the product formulation to the wash liquor is at least 10% (based on starting amount of the precursor). The pH of the wash liquor should therefore be at least about pH 9, preferably at least about pH 9.3, and most preferably above at least about pH 9.5, although the optimal pH range will depend upon the particular precursor. In one preferred embodiment of the present invention, the peracid precursor is chosen such that there is better than 90% delivery of peroxy acid to the wash liquor within 12 minutes of the addition of the colloidal dispersion formulation. According to another preferred embodiment, greater than 95% delivery of peroxyacid takes place in 12 minutes.

B. Chelating agents

Under certain situations, it may be desirable to include stabilizers for the hydrogen peroxide or other peroxide source and any organic components suspended therewith, such as a combination of chelating agents and antioxidants (see, e.gs., Baker et al. U.S. Pat. No. 4,764,302, and Mitchell et al., U.S. Pat. No. 4,900,968, incorporated herein by reference). Examples of suitable chelating agents are phosphonates known under the tradenames of DEQUEST® (Monsanto Company) and BRIQUEST® (available from Albright & Wilson). Examples of suitable antioxidants include BHT (butylated hydroxytoluene) and BHA (butylated hydroxyanisole).

C. Codispersants

Codispersants may comprise organic solvents and preferably comprise at least one hydrophobic solvent. Suitable codispersants include, without limitation: alkyl solvents in branched or linear form as well as substituted derivatives thereof; cycloalkyl solvents in branched or linear form as well as substituted derivatives thereof; toluene and substituted toluenes; ethyl acetate; etc. In one embodiment of the invention, the codispersant is hexane.

D. Other Adjuncts

Small amounts of other adjuncts can be added to the various executions of the present invention for improving cleaning performance or aesthetic qualities of the formulated product. Performance adjuncts include surfactants, solvents, enzymes, fluorescent whitening agents (FWA's), electrolytes and builders, anti-foaming agents, foam boosters, preservatives (if necessary), antioxidants and opacifiers, etc. See Gray, et al., U.S. Pat. No. 5,019,289 and U.S. Pat. No. 4,891,147, incorporated by reference herein. When builders or electrolytes are used, they may be incorporated as dispersed particles within the colloidal dispersion in a first portion of a delivery execution. Alternately, builders or electrolytes may also be included in a liquid delivered as part of a second portion of a delivery execution.

Aesthetic adjuncts include fragrances, such as those available from Firmenich, Givaudan, IFF, Quest and other suppliers, as well as dyes and pigments which can be solubilized or suspended in the formulations, such as diaminoanthraquinones. In the dual delivery executions, an indicator dye can also be added to demonstrate that the perhydrolysis reaction has taken place. The range of such cleaning and aesthetic adjuncts should be in the range of 0–10%, more preferably 0–5% by weight.

In certain colloidal dispersions (such as liquid crystals), it has been found optimal to use an inorganic salt brine, preferably an alkali metal halide such as sodium chloride or potassium chloride, as the liquid matrix for the continuous phase. The brine comprises preferably between about 1% to 25% and most preferably about 5% to about 15% inorganic salt in deionized water. Finally, the amount of brine in the liquid crystal ranges from about 35% to about 98.1% by weight, more preferably about 40% to about 80% by weight and most preferably about 65% to about 80% by weight of the inventive colloidal dispersion.

Surfactants which are suitable for inclusion with the alkaline moieties can be selected from those described in *Kirk-Othmer, Encyclopedia of Chemical Technology*, 3rd ed., Volume 22, pp. 332–432 (Marcel-Dekker, 1983), which are incorporated herein by reference, except that compatibility with the precursor is of less concern, since the alkaline buffer is kept in a separate delivery chamber. Thickeners may be selected from water soluble or dispersible polymers, such as polyacrylates, polyethylene glycols, polymaleic acid or anhydride copolymers, polyvinyl alcohol, polyvinyl acetate, polyvinyl pyrrolidone, hydroxymethylpropylcellulose, guar gum, xanthan gum and the like. Certain polyacrylates sold by B. F. Goodrich under the trademark CARBOPOL® are preferred.

Chelating agents, dyes, fragrances and other materials are as described in the foregoing sections pertaining to adjunct materials in the inventive colloidal compositions. The alkaline moiety will preferably contain about 1–15%, more preferably 2–10% and most preferably 2–7.5% alkaline material, with the other adjuncts providing no more than 5%, and the remainder being water (preferably deionized). The pH of the alkaline moiety is preferably greater than 7, more preferably greater than 8 and most preferably greater than 8.5.

LIQUID CRYSTALS

One form of the liquid peracid precursor colloidal dispersions of the present invention are liquid crystals. Liquid crystals are one form of lyophilic colloids, i.e., structural aggregates that form spontaneously by the self-association of individual emulsifier molecules in aqueous media. Liquid crystals may be further categorized as belong to one of three distinct liquid crystal forms: lamellar, hexagonal and cubic.

a) Lamellar. Lamellar liquid crystals feature surfactant molecules arranged in bilayers that are separated by layers of the dispersion medium. These bilayers extend over large distances, commonly on the order of several micrometers or more. Emulsifier bilayer thicknesses are approximately 10–30% less than the length of two all-trans surfactant chains. This system is characterized by essentially infinite lamellar sheets of surface active agents which have sufficiently regular lattice spacing of from 25 to 70 Å so as to be readily detectable by neutron diffraction when present as a substantial proportion of a composition.

b) Hexaganol. Hexagonal liquid crystals consist of rod-shaped aggregates of indefinite length packed in hexagonal arrays and separated by regions of the dispersion medium. There is also a so-called "reversed hexagonal" form, in which hydrocarbon chains occupy spaces between hexagonally packed cylinders of dispersion medium molecules.

c) Cubic. Also called referred to as "viscous isotropic", cubic liquid crystals have structures which are not always well established. One theory is that the molecular aggregates are packed in a cubic array. Other structures consist of bicontinuous networks having interfaces with both positive and negative curvatures.

Liquid crystal dispersions containing the peracid precursors and at least one nonionic surfactant are theoretically thermodynamically stable and should remain so despite aging (aside from any decomposition attributable to the raw materials which may occur with time). The liquid crystals of the present invention are thermodynamically stable structures and will not phase separate upon centrifugation.

One example of a liquid crystal system containing a water-insoluble oil is illustrated, e.g., by F. Lichterfeld, et al., J. Phys. Chem. 90 (1986) 5762–5766, "Microstructure of Microemulsions of the System $H_2O$—n-Tetradecane-$C_{12}E_5$," incorporated herein by reference. In the present invention, a water-insoluble peracid precursor plays the role of the hydrocarbon oil in the cited reference. Such one-phase liquid crystals containing peracid precursors offer stable fluids with viscosities that are significantly higher than that of water (i.e., they present thickened systems) without the need for adding supplemental thickening agents.

Liquid crystals may be prepared by mixing all ingredients together with some form of gentle mixing such as stirring or brief vortexing, the latter which may be especially well suited in the case of smaller quantities. Although liquid crystals are self-assembling, it is preferable to use a mixing technique in order to ensure thorough blending of all of the ingredients. This is due to the high viscosity that liquid crystalline solutions tend to exhibit relative to water. The amount of mixing which is required here is more than that which would be required for the formation of less viscous microemulsions.

In the absence of a mixing technique, the onset of the formation of viscous liquid crystal colloidal dispersions could greatly reduce the efficiency of mixing of the remaining ingredients in solution such that continued growth of the liquid crystalline dispersion could be greatly impeded. For this reason, mixing thus ensures a uniform liquid crystal product formation, which is especially important for commercial scale production. As liquid crystals are theoretically thermodynamically stable structures, they do not depend on the energy intensity of the mixing process for formation.

Selection of one embodiment over another depends on, among other things, the location of the phase boundaries of the system, i.e., the upper and lower limits of a range of temperatures over which the liquid crystal phase exists for any particular given precursor-emulsifier-continuous phase mixture. The liquid crystal systems of the present invention contain higher concentrations of emulsifier than do the macroemulsion systems described in co-pending application U.S. Ser. No. 08/450,740 filed concurrently herewith. In other words, the liquid crystals characteristically contain greater amounts of emulsifier in terms of percent weight of the total colloidal dispersion composition than do macroemulsions. In addition, the ratio of emulsifier to peracid precursor is higher for liquid crystals that it is for any same emulsifier/peracid precursor combination found in a macroemulsion.

The higher emulsifier concentrations of the present invention are useful in producing laundry detergents or fabric stain remover products containing the additional benefits provided by a peracid precursor. In one embodiment of the invention, a very high concentration of the peracid precursor (approximately 30 wt. %) can be delivered in a liquid crystal which does not flow when inverted in a test tube, giving rise to a "gel". Such gels or thickened products are useful as e.g. fabric pre-treatment products or stain removers, since the gels help localize the product formulation on a particular target area of a fabric, such as on a stain. The "gels," which can be formulated based on peracid precursor liquid crystals, however, do not require the addition of polymeric thickening agents, as is often the case for conventional "thickened" consumer cleaning products.

For ease and flexibility of manufacturing, it is also desirable to produce the liquid crystals with the same or similar emulsifiers as employed in the production of the macroemulsions. Nonionic emulsifiers are preferred because the pH of the microemulsions may be readily adjusted over a range from approximately 2 to 8 without extensive changes in the useful temperature range of the microemulsions. Examples of microemulsions produced with the same emulsifiers as employed in the macroemulsions of co-pending application U.S. Ser. No. 08/450,740 are given in the experimental section below.

The range of temperatures at which the inventive liquid crystals may be used are essentially those typically encountered in the use and storage of conventional cleaning products by consumers, i.e., between about −10° C. and 70° C. Although colloidal dispersions having liquid matrices comprised primarily of water may tend to freeze close to 0° C., upon gentle mixing the liquid crystals will reform at room temperature. For this reason, it is more preferred that the liquid crystals are used within a temperature range of about −5° C. to about 60° C., and most preferably within a range of from about 0° C. to about 50° C. The exact range over which a particular form will exhibit thermodynamic stability is dependent upon the nature of the ingredients as well as the temperature. That is, the phase boundaries for a particular colloidal dispersion are functions of temperature and the composition. The exact location of the phase boundaries will therefore determine the usefulness of any particular colloidal dispersion.

In one embodiment of the present invention, liquid crystals are the only phase found within the colloidal dispersion. In another embodiment of the invention, liquid crystals may be found within surfactant-oil-water systems in equilibrium with another colloidal dispersion such as, but not necessarily limited to, microemulsions and oil-swollen micelles, such that the viscosity of the system provided by the liquid crystals prevents macroscopic separation of the different dispersion upon storage from about freezing to about 50° C. (≈120° F.).

Where water is the continuous phase in whole or in part, liquid crystals prepared according to the present invention may be cooled to temperatures as low as zero degrees Celsius (0° C.) without danger of freezing and without permanent loss of structural elements characteristic of liquid crystals. Naturally, the fact that the dispersions do not freeze at 0° C. in such aqueous systems is due in part to the presence of oil and surfactant "impurities" which lower the aqueous freezing point of the dispersions. On the other hand, the liquid crystals of the present invention are also stable to temperatures above 25° C. (approximately room temperature). Even where a reduction or elevation in temperature did cause the system to transcend a particular phase boundary, providing there was no decomposition or loss of ingredients, the liquid crystals will be regenerated upon thermal cycling back to the original temperature owing to their thermodynamic stability. Gentle mixing could facilitate the restoration of equilibrium, but it is not thermodynamically required.

Liquid Crystals - Experimental

Samples were prepared in small reaction vessels (test tubes) with brief vortexing to gently mix the ingredients together. The rate of formation can be enhanced with the application of a mixing technique, typical of which may include gentle stirring, sonication, mixing (including the use of "static" mixers where several liquid streams are pumped together), or brief vortexing, etc. Samples were then tested for colloidal stability by visual inspection and by examination between crossed polarizers. The most preferred liquid crystal systems were clear, optically anisotropic fluids (when examined between crossed polarizers), with viscosities significantly greater than water at room temperature. Visual inspection was employed to assess the temperature ranges over which the liquid crystal systems remained physically stable.

Some decreases in bleach activator content were observed when the bleach activator used was in the form of a phenoxyacetyl compound in general, and when the activator was nonanoylglycoyl benzene (NOGB), in particular. Applicants speculate, without being bound by theory, that the loss of phenoxyacetyl may be due in part to reaction with peroxide when peroxide is present in the continuous phase. In another preferred embodiment, nonanoyloxybenzene (NOB) could be used as an alkanoyloxybenzene activator. A preferred synthesis for NOB is given in Example 8 and a sample formulation using NOB (Example 9) is shown below.

In Example 1, a typical liquid crystal system was prepared.

EXAMPLE 1

| Ingredient | Weight (g) | Wt. % |
|---|---|---|
| NOGB | 0.768 | 4.85 |
| NEODOL ® 91-6 | 3.862 | 24.40 |
| 8.6% NaCl Brine | 11.199 | 70.75 |

The resulting liquid crystal was a clear, viscous fluid exhibiting birefringence when viewed between crossed polarizers at 25 C. The turbidity and viscosity of the sample increased at 0° C., but no separation of phases occurred within 8 hours. The sample remained a single phase, liquid crystal system at all temperatures up to 40° C. The sample exhibited increasing turbidity and decreasing viscosity between 40° C. and 42° C. From 42° C. up to approximately 50° C., the sample separated into 2 phases. The original liquid crystal system reformed, however, with mixing of the sample components upon cooling back down to 25° C.

EXAMPLE 2

The liquid crystal dispersion of Example 1 was stored at room temperature for three weeks to test for hydrolytic stability of the peracid precursor. The colloidal dispersion exhibit no visually detectable change and remained a clear, viscous fluid. After storage, HPLC analysis indicated 98.48% of the NOGB remaining in the sample. The visual appearance and optical anisotropy of the sample were also unchanged.

EXAMPLE 3

| Ingredient | Wt. % |
|---|---|
| Neodol 91-6 | 25.1 |
| NOGB | 3.7 |
| Brine (11.55% NaCl in deionized water) | 71.2 |

The resulting liquid crystal was a clear, very viscous fluid exhibiting birefringence when viewed between crossed polarizers at 25° C. The turbidity and viscosity of the sample increased when the liquid was cooled down to 0° C., but no separation of phases occurred within 8 hours at this lower temperature. The viscous liquid crystal remained present above room temperature, up to at least 38° C. The liquid crystal was visually unchanged and optically anisotropic after storage at room temperature for 7 days.

EXAMPLE 4

| Ingredient | Wt. % |
|---|---|
| Neodol 91-6 | 24.72 |
| NOGB | 4.4 |
| Brine (11.55% NaCl in deionized water) | 70.88 |

The resulting liquid crystal was a clear, very viscous fluid exhibiting birefringence when viewed between crossed polarizers at 25° C. The sample did not flow upon inverting the reaction vessel when the temperature of the sample was cooled down below 23° C. The turbidity and viscosity of the sample increased upon cooling down to 0° C., but no separation of phases occurred after 8 hours at this lower temperature. The viscous liquid crystal was present at temperatures of up to 33° C. The liquid crystal was visually unchanged and optically anisotropic after storage at room temperature for 7 days.

The example of a liquid crystal system which is useful for delivering a very high concentration of a peracid precursor in a "gel" form suitable for use as a fabric pre-treatment product may be comprised of:

EXAMPLE 5

| Ingredient | Wt.% |
|---|---|
| ETHOX CO-25 | 42.7 |
| NOGB | 30.2 |
| Brine (5.02% NaCl in deionized water) | 27.1 |

The resulting liquid crystal system is a clear, optically anisotropic "gel" which does not flow when the reaction vessel was inverted for any temperature between 0° C. and 40° C. Above 40° C., the viscosity of the liquid crystal decreased enough to allow flow of the system upon inversion of the reaction vessel. No separation of any phases was noted below 54° C. The viscosity and appearance of the liquid crystal system was unchanged after heating to 54° C. and cooling back to room temperature, i.e., the sample again behaved like a gel upon cooling to 25° C.

TABLE II

| Ingredient | EXAMPLE 6 | EXAMPLE 7 |
|---|---|---|
| NEODOL ® 91-6 | 23.49 | 23.14 |
| NOGB | 4.88 | 4.93 |
| NaCl | 5.22 | 4.93 |
| $H_2O_2$ | 2.46 | 2.85 |
| Water | 63.95 | 64.15 |

The samples in Table II above, Examples 6 and 7, were viscous liquid crystals at 30° C. The pH of Example 6 was adjusted to 2.2, while that of Example 7 was unadjusted. HPLC analysis of the samples showed losses of over 67% of the NOGB within 8 days at room temperature, whereas Example 2 (no hydrogen peroxide present) showed less than 1.5% loss over the same time period.

EXAMPLE 9

A solution of 5.00 g (31.6 mmol) of nonanoic acid, 3.93 g (34.76 mmol) of chloroacetyl chloride (CAC), 2.7 g (31.6 mmol) of phenol, and 35 ml of acetonitrile was delivered to a clean, dry, two neck 100 ml round bottom flash fitted with a mechanical stirrer and a reflux condenser. The reaction flask was flushed with nitrogen through a gas inlet at the top of the reflux condenser and placed in an 80° C. oil bath and stirred for 19 hours. The reaction mixtures was allowed to cool to room temperature and then vacuum filtered through 30 g of neutral alumina to remove chloroacetic acid. The purified product was then placed on a high vacuum line overnight to remove any residual solvent. Phenyl nonanoate (NOB) was isolated as a faint yellow liquid (6.18 g, 26.37 mmol) in 83% yield. The purity of NOB was determined to be over 97%.

EXAMPLE 9

According to one embodiment of the present invention, the NOB resulting from the synthesis described in Example 9 may be used as the peracid precursor in combination with a nonionic surfactant to form liquid crystals according to the following:

| Ingredient | Wt. % |
|---|---|
| NOB | 5.0 |
| NEODOL ® 91-6 | 25.0 |
| Brine (7.0% NaCl in deionized water) | 70% |

Examples 10 and 11 below provide two sets of ingredients which can be combined together in a second delivery portion comprising a liquid alkalinity source. The second delivery portion can be used in combination with a first delivery portion comprising an inventive microemulsion in order to deliver a product formulation according to one embodiment of the present invention. Example 11 also demonstrates the use of borax, a stabilizing agent, to further stabilize the perborate (see, Peterson et al., EP 431,747).

| EXAMPLE 10 Wt. % | Ingredient | EXAMPLE 11 Wt. % |
|---|---|---|
| 0.32 | Fluorescent Whitener | 0.32 |
| 0.85 | Carbopol 700 Thickener | 0.85 |
| 5.00 | Sodium Metasilicate | 5.00 |
| — | Sodium Borate · 10 $H_2O$ (borax) | 2.60 |
| 7.92 | Sodium Perborate · 4 $H_2O$ | 7.92 |
| 3.30 | BRIQUEST AS-45 (4.5%) | 3.30 |
| 82.61 | Deionized Water | 80.01 |

The above two formulations were tested at 70 F. (≈21.1° C.) and 100° F. (≈37.8° C.), respectively, for up to 27 days. The results were:

TABLE III

| | | % Perborate Remaining | | | |
|---|---|---|---|---|---|
| EXAMPLE | Temp. | Day 0 | Day 5 | Day 13 | Day 27 |
| 10 | 70° F. | 100% | 96% | 99% | 91% |
| 11 | " | 100% | 101% | 98% | 100% |
| 10 | 100° F. | 100% | 81% | 66% | 40% |
| 11 | " | 100% | 101% | 97% | 96% |

No error analysis was available for this study. Nonetheless, a clear trend appears to show that using a perborate stabilizer will desirably enhance the stability of the perborate.

The above Examples reveal that stable peracid precursor-containing liquid colloidal dispersions may be prepared for use in delivering a peroxyacid to a wash application. The colloidal dispersions may furthermore be formulated as part of a unitary or dual delivery execution.

Although specific components and proportions have been used in the above description of the preferred embodiments of the novel peracid precursor colloidal dispersions, other suitable materials and minor variations in the various steps in the system as listed herein may be used. In addition, other materials and steps may be added to those used herein, and variations may be made in the colloidal dispersions and delivery executions to improve upon, enhance or otherwise modify the properties of or increase the uses for the invention.

It will be understood that various other changes of the details, materials, steps, arrangements of components and uses which have been described herein and illustrated in order to explain the nature of the invention will occur to and may be made by those skilled in the art upon a reading of this disclosure, and such changes are intended to be included within the principle and scope of this invention. The invention is further defined without limitation of scope or of equivalents by the claims which follow.

What is claimed is:

1. A stable liquid peracid precursor composition for delivering a bleaching and cleaning material, said liquid peracid precursor composition combining:

(a) a dispersion medium comprising:

(i) a stabilizing effective amount of a liquid matrix; and (ii) an emulsifier, and (b) a dispersed phase comprising a peracid precursor;

wherein said bleaching and cleaning material comprises either a hydrophobic or hydrotropic generated mono- or diperoxyacid, or mixtures thereof, said liquid matrix comprises at least 60 wt. % water, the HLB of said emulsifier is appreciably different from the HLB of said peracid precursor, and said peracid precursor composition is characterized as a liquid crystal.

2. The stable liquid peracid precursor composition of claim 1 wherein said generated mono- or diperoxyacid has a structure corresponding either to Formula I:

```
   O
   ||
Q—C—O—OH
```

Formula I wherein Q may be selected from the group consisting of:

R—(O)—O—$CH_2$—;

$R^1$;

$R^2$—($C_6H_4$)—$CH_2$—;

$R^3$;

$R^4$;

$R^5$—[C(O)—O—$CH_2$]m—;

$R^6$—C(O)—$CH_2$—$CH_2$—; and $R_7$—O— and further wherein:

R and $R^1$ are straight or branched chain $C_{1-20}$ alkyl or alkenyl;

$R^2$ is either H or $C_{1-5}$ alkyl;

$R^3$ and $R^4$ are $C_{1-20}$ alkyl; and $R^5$ is a straight or branched chain $C_{1-20}$ alkyl or alkenyl;

$R^6$ is $C_{1-20}$ alkyl;

$R^7$ is $C_{1-20}$ alkyl or a mixture thereof;

and m is from 1.5 to 10;

or Formula II:

```
        O           O
        ||          ||
HO—O—C—(CH2)n—C—O—OH
```

Formula II wherein n is from 4 to 18.

3. A stable peracid precursor composition for delivering a bleaching and cleaning material, said peracid precursor composition combining:

(a) a bleaching effective amount of a hydrophobic peracid precursor of a hydrotropic or hydrophobic peroxyacid;

(b) an emulsifier to disperse said peracid precursor; and (c) a stabilizing effective amount of a liquid matrix;

wherein said liquid matrix comprises at least 60 wt. % water and said peracid precursor composition is characterized as a liquid crystal.

4. The stable liquid peracid precursor composition of claim 3 wherein the peracid precursor is non-sulfonated.

5. The stable liquid peracid precursor composition of claim 3 wherein the emulsifier is selected from the group consisting of nonionic, anionic, cationic, amphoteric and zwitterionic surfactants, and combinations thereof.

6. The stable liquid peracid precursor composition of claim 3 wherein the emulsifier is a nonionic surfactant.

7. The stable liquid peracid precursor composition of claim 3 wherein the HLB of said emulsifier is appreciably different from the HLB value of said peracid precursor.

8. The stable liquid peracid precursor composition of claim 3 herein said emulsifier has an HLB value of about 8 to about 18.

9. The stable liquid peracid precursor composition of claim 3 wherein said peracid precursor is selected from the group consisting of: phenyl esters and substituted polyglycoyl esters, as well as mixtures thereof.

10. The stable liquid peracid precursor composition of claim 9 wherein said peracid precursor is a phenyl ester having no ionizable groups.

11. The stable liquid peracid precursor composition of claim 9 wherein said phenyl ester is either an alkanoylglycoylbenzene or an alkanoyloxybenzene.

12. The stable liquid peracid precursor composition of claim 9 wherein said phenyl ester is an alkanoylglycoylbenzene and has the structure

```
   O           O
   ||          ||
R—C—O—CH2—C—O—Ø
```

wherein R is a straight or branched chain $C_{1-20}$ alkyl or alkenyl, and Ø is phenyl.

13. The stable liquid peracid precursor composition of claim 9 wherein said alkanoylglycoylbenzene is either hexanoylglycoylbenzene, heptanoylglycoylbenzene, octanoylglycoylbenzene, nonanoylglycoylbenzene, decanoylglycoylbenzene, undecanoylglycoylbenzene, dodecanoylglycoylbenzene, or mixtures thereof.

14. The stable liquid peracid precursor composition of claim 9 wherein said alkanoylglycoylbenzene is nonanoylglycoylbenzene.

15. The stable liquid peracid precursor composition of claim 9 wherein said peracid precursor is either a phenyl ester of chloroacetyl chloride and phenol, a phenyl ester of phenoxyacetic acid, a phenyl ester of a substituted succinate, a phenyl ester of a carbonic acid, a phenyl ester of dicarboxylic acid or a mono- or diester of dihydroxybenzene.

16. The stable liquid peracid precursor composition of claim 9 wherein said peracid precursor is a substituted polyglycoyl compound.

17. The stable liquid peracid precursor composition of claim 6 wherein said nonionic surfactant is selected from the group consisting of alkoxylated alcohols, alkoxylated ether phenols, alkoxylated mono-, di- and triglycerides, polyglycerol alkylethers, alkyl polyglycosides, alkyl glucamides and sorbitan esters.

18. The stable liquid peracid precursor composition of claim 17 wherein said nonionic surfactant is an alkoxylated alcohol.

19. The stable liquid peracid precursor composition of claim 17 wherein said nonionic surfactant is an alkoxylated mono-, di- or triglyceride.

20. The stable liquid peracid precursor composition of claim 3 further comprising (d) a peroxide source.

21. The stable liquid peracid precursor composition of claim 20 wherein said peroxide source is hydrogen peroxide.

22. The stable liquid peracid precursor composition of claim 2 further comprising:

(e) an adjunct selected from the group consisting of buffering agents, chelating agents, codispersants, solvents, enzymes, fluorescent whitening agents (FWA's), electrolytes, antioxidants, builders, antifoaming agents, foam boosters, preservatives, opacifiers, thickeners, fragrances, dyes, colorants, pigments and mixtures thereof.

23. A method for cleaning stains or soils comprising applying a composition as recited in claim 3 to said stain or soil.

* * * * *